United States Patent
Oda et al.

(10) Patent No.: US 9,218,070 B2
(45) Date of Patent: Dec. 22, 2015

(54) POINTING MEMBER, POSITION DETECTION APPARATUS AND POSITION DETECTION METHOD CAPABLE OF DETECTING POSITION OF AND PRESSURE APPLIED TO POINTING MEMBER

(75) Inventors: Yasuo Oda, Saitama (JP); Yoshihisa Sugiyama, Saitama (JP)

(73) Assignee: Wacom Co., Ltd., Saitama (JP)

( * ) Notice: Subject to any disclaimer, the term of this patent is extended or adjusted under 35 U.S.C. 154(b) by 460 days.

(21) Appl. No.: 12/862,270

(22) Filed: Aug. 24, 2010

(65) Prior Publication Data

US 2011/0155479 A1    Jun. 30, 2011

(30) Foreign Application Priority Data

Dec. 25, 2009 (JP) ................................. 2009-295890

(51) Int. Cl.
*G06F 3/0354* (2013.01)
*G06F 3/044* (2006.01)
(Continued)

(52) U.S. Cl.
CPC ............ *G06F 3/03545* (2013.01); *G06F 3/044* (2013.01); *G06F 3/046* (2013.01); *G06F 3/0383* (2013.01)

(58) Field of Classification Search
CPC .............. G06F 3/03545; G06F 3/0412; G06F 3/044–3/047
USPC .......... 178/19.01–19.07, 18.01, 18.03, 18.06, 178/18.07; 345/156, 179; 382/312–314
See application file for complete search history.

(56) References Cited

U.S. PATENT DOCUMENTS 5,138,118 A * 8/1992 Russell ........................ 178/19.03
5,600,105 A    2/1997 Fukuzaki et al.
(Continued)

FOREIGN PATENT DOCUMENTS

CN    101174192 A     5/2008
EP       607694 A1 *  7/1994
(Continued)

OTHER PUBLICATIONS

English language translation of JP 2001-282444 by Ohashi Tsutomu (Coordinate Input Tool and Coordinate Reader; Published Dec. 10, 2001; hereinafter Tsutomu.*
(Continued)

*Primary Examiner* — Nalini Mummalaneni
(74) *Attorney, Agent, or Firm* — Seed IP Law Group PLLC

(57) ABSTRACT

Methods and apparatus are provided to further facilitate detection not only of a position on a position detector pointed to by a pointing member, but also of information other than the position information such as pen pressure applied to the pointing member, in a position detection apparatus of the electrostatic coupling type. In one embodiment, a pointing member includes a first electrode substantially in the form of a rod, a substantially cylindrical second electrode disposed in such a manner as to surround the first electrode, and a transmission signal production section for producing a signal of a first frequency f1 and another signal of a second frequency f2 different from the first frequency f1 and controlling a phase difference between the signals in response to pressure applied to the pointing member. On a position detector side, the signal of the first frequency f1 is used for position detection of the pointing member, and the phase difference is used for detection of information other than the position information such as pen pressure on the pointing member. Alternatively, a pulse signal having a pulse width corresponding to pressure applied to the pointing member is produced, and on the position detector side, the position, pen pressure and so forth are detected from the pulse signal and the pulse width.

16 Claims, 8 Drawing Sheets

(51) Int. Cl.
  *G06F 3/046*  (2006.01)
  *G06F 3/038*  (2013.01)

(56) References Cited

U.S. PATENT DOCUMENTS

| | | | |
|---|---|---|---|
| 5,608,390 A * | 3/1997 | Gasparik | 340/870.01 |
| 5,854,881 A | 12/1998 | Yoshida et al. | |
| 6,744,426 B1 | 6/2004 | Okamoto et al. | |
| 8,154,525 B2 | 4/2012 | Katsurahira | |
| 2004/0201580 A1* | 10/2004 | Fujiwara et al. | 345/179 |
| 2005/0174259 A1* | 8/2005 | Ely | 341/5 |
| 2005/0189154 A1 | 9/2005 | Perski et al. | |
| 2007/0188480 A1 | 8/2007 | Teng et al. | |
| 2008/0099254 A1 | 5/2008 | Katsurahira | |
| 2009/0065269 A1 | 3/2009 | Katsurahira | |
| 2010/0155153 A1* | 6/2010 | Zachut | 178/18.03 |

FOREIGN PATENT DOCUMENTS

| | | | |
|---|---|---|---|
| EP | 1413975 A1 * | 4/2004 | |
| EP | 2 172 834 A2 | 4/2010 | |
| JP | 04092915 A | 3/1992 | |
| JP | 8050535 A | 2/1996 | |
| JP | 08095700 A | 4/1996 | |
| JP | 08179871 A | 7/1996 | |
| JP | 2001282444 A | 10/2001 | |
| JP | 2002244804 A | 8/2002 | |
| JP | 2004310598 A | 11/2004 | |
| JP | 2009069898 A | 4/2009 | |
| TW | 200731122 A | 8/2007 | |
| TW | 200832204 A | 8/2008 | |
| WO | 2006/059336 A2 | 6/2006 | |

OTHER PUBLICATIONS

Japanese Office Action dated Feb. 19, 2013, for corresponding JP Application No. 2009-295890, 3 pages.
Chinese Office Action dated Dec. 4, 2013, for corresponding CN Application No. 201010572446.3, 10 pages.
Extended European Search Report dated Jan. 29, 2014, for corresponding European Application No. 10196543.2-1507, 10 pages.
Korean Office Action dated Aug. 30, 2013, for corresponding KR Application No. 10-2010-0098903, 4 pages.
Taiwan Office Action dated Oct. 23, 2014, for corresponding TW Application No. 099130877, 7 pages.

* cited by examiner

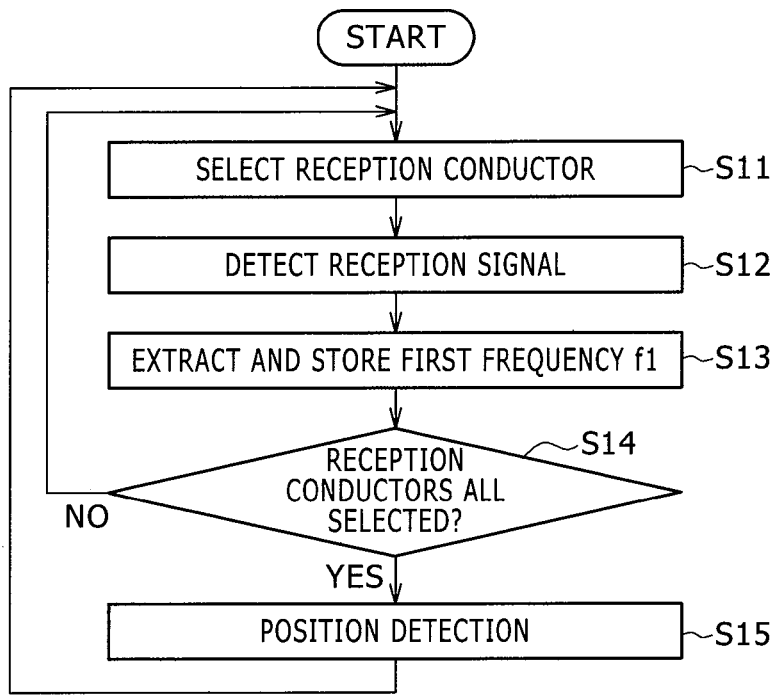
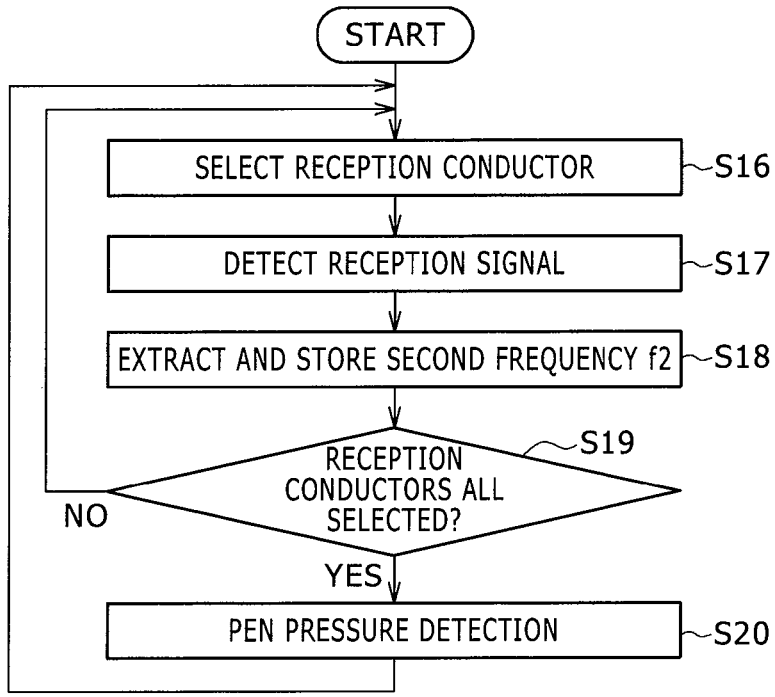

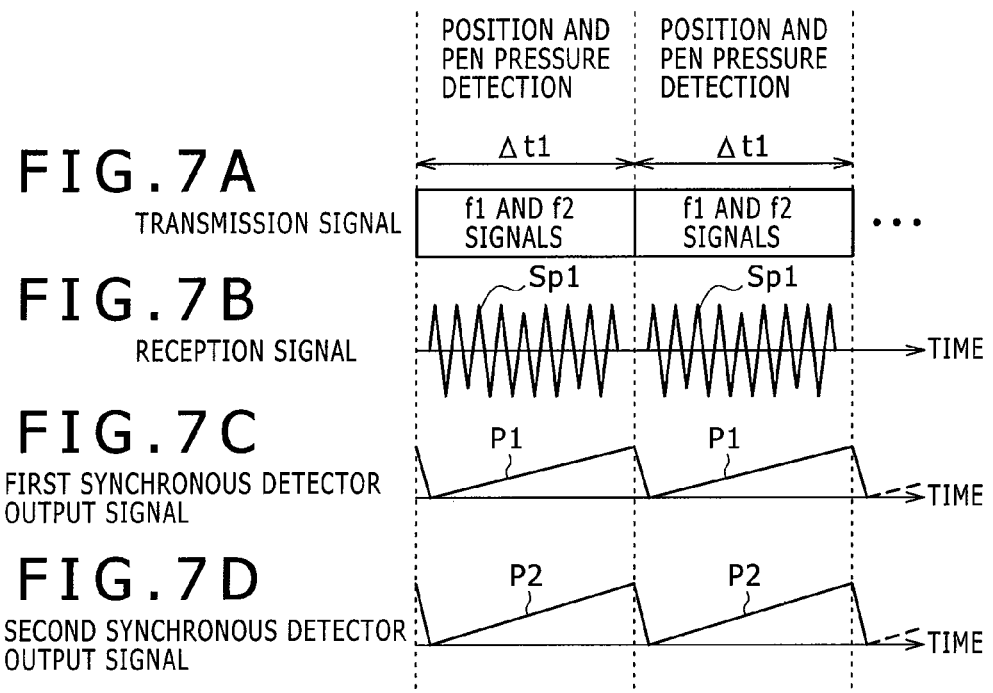
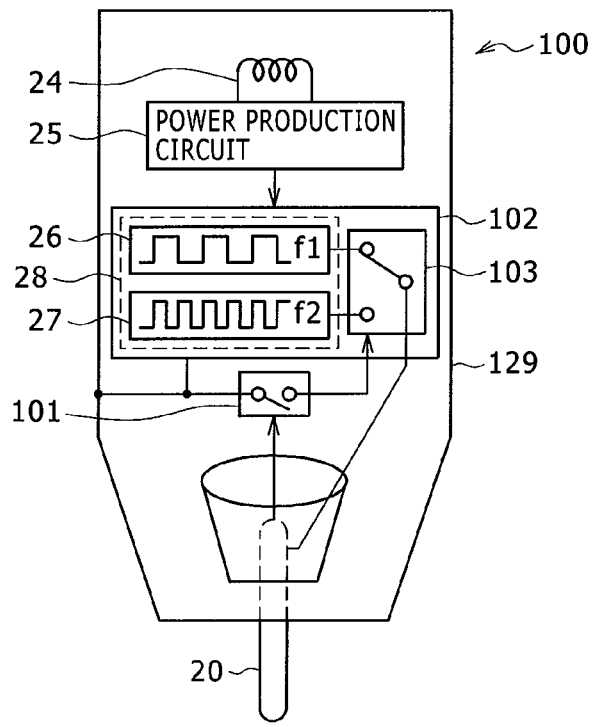

POINTING MEMBER, POSITION DETECTION APPARATUS AND POSITION DETECTION METHOD CAPABLE OF DETECTING POSITION OF AND PRESSURE APPLIED TO POINTING MEMBER

CROSS-REFERENCE TO RELATED APPLICATION

This application claims the benefit under 35 U.S.C. §119(a) of Japanese Application No. 2009-295890, filed Dec. 25, 2009, the entire content of which is incorporated herein by reference.

BACKGROUND

This invention relates to a pointing member, a position detection apparatus and a position detection method, and more particularly to a pointing member, a position detection apparatus and a position detection method to which an electrostatic coupling system is applied.

Position detection apparatus, often called pen tablets, have been developed for use in imaging or illustration production on a computer. Such a position detection apparatus as just described normally includes a position detector (tablet), substantially in the form of a flat plate, and a pointing member in the form of a pen that is operated by a user on the position detector.

Some position detection apparatus as described above may adopt an electrostatic coupling system. The position detection apparatus that uses an electrostatic coupling system principally includes a pointing member including an integrated circuit (IC), and a position detector including a sensor section having a group of conductors arrayed in a predetermined pattern. A predetermined signal is transmitted from the pointing member placed on the sensor section to the conductor group, and the position pointed to by the pointing member is specified based on the transmission signal detected by the position detector. See, for example, Japanese Patent Laid-Open No. Hei 8-50535.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In a conventional position detection apparatus that employs an electrostatic coupling system, the number of frequencies used to transmit a signal from the pointing member to the sensor section is one. Therefore, although it is possible for such a position detection apparatus as just described to detect a position that is pointed to by the pointing member, it is difficult to detect information other than the position information such as information regarding pen pressure of the pointing member and information regarding "pen down" (i.e., information regarding whether or not a pointing member is in contact with the sensor section).

The present invention has been made to solve the problem described above. According to one aspect, the present invention further facilitates detection not only of a position pointed to by a pointing member but also of information other than the position information such as pen pressure information in a position detection apparatus, particularly in a position detection apparatus with an electrostatic coupling system.

In order to solve the problem described above, a position detection apparatus in accordance with one embodiment of the invention includes a pointing member for transmitting a signal for position pointing, and a position detector including a sensor section that is configured to be pointed to at a position thereof by the pointing member and to receive the signal for position pointing transmitted from the pointing member. The position detector is configured to detect the position on the sensor section pointed to by the pointing member based on the signal for position pointing received by the sensor section. The pointing member includes a transmission signal production section configured to produce a signal of a first frequency and a signal of a second frequency different from the first frequency and to control production timings of the signal of the first frequency and the signal of the second frequency in response to a pressing force applied to the pointing member when the pointing member points to a position on the sensor section. The position detector is configured to detect the position on the sensor section pointed to by the pointing member based on at least one of the signal of the first frequency and the signal of the second frequency, and to detect the pressing force applied to the pointing member when it points to the position on the sensor section based on a phase difference between the signal of the first frequency and the signal of the second frequency.

According to an embodiment of the invention, another position detection apparatus includes a pointing member for transmitting a signal for position pointing, and a position detector including a sensor section that is configured to be pointed to at a position thereof by the pointing member and to receive the signal for position pointing transmitted from the pointing member. The position detector is configured to detect the position on the sensor section pointed to by the pointing member based on the signal for position pointing received by the sensor section. The pointing member includes a transmission signal production section configured to produce a predetermined pulse signal and to control a pulse width of the predetermined pulse signal in response to a pressing force applied to the pointing member when the pointing member points to a position on the sensor section. The position detector is configured to detect the position on the sensor section pointed to by the pointing member based on the presence of the predetermined pulse signal and to detect the pressing force applied to the pointing member when it points to the position on the sensor section based on a pulse width of the predetermined pulse signal.

According to an embodiment of the present invention, a pointing member includes a pen tip projecting from a housing, which is used for position pointing, and a transmission signal production section that is configured to produce a transmission signal corresponding to a pressing force to the pen tip. The transmission signal production section produces a signal of a first frequency and another signal of a second frequency different from the first frequency and controls production timings of the signal of the first frequency and the signal of the second frequency in response to the pressing force to the pen tip.

Further, according to an embodiment of the present invention, another pointing member includes a pen tip projecting from a housing, which is used for position pointing, and a transmission signal production section that is configured to produce a transmission signal corresponding to a pressing force to the pen tip. The transmission signal production section produces a predetermined pulse signal and controls a pulse width of the predetermined pulse signal in response to the pressing force to the pen tip.

Furthermore, according to an embodiment of the present invention, a position detection method is provided by which a position detection signal is produced. According to the position detection method, a pointing member transmits a signal for position pointing while a sensor section is pointed to at a position thereof by the pointing member and receives the signal for position pointing transmitted from the pointing member. A position detector detects the position on the sensor section pointed to by the pointing member based on the signal for position pointing received by the sensor section. The pointing member produces a signal of a first frequency and a signal of a second frequency different from the first frequency and controls production timings of the signal of the first frequency and the signal of the second frequency in response to a pressing force applied to the pointing member when it points to a position on the sensor section. The position detector detects the position on the sensor section pointed to by the pointing member based on at least one of the signal of the first frequency and the signal of the second frequency and detects the pressing force applied to the pointing member when it points to the position on the sensor section based on a phase difference between the signal of the first frequency and the signal of the second frequency.

Meanwhile, in another embodiment, a position pointing method of the present invention produces a signal of a first frequency and a signal of a second frequency different from the first frequency and controls production timings of the signal of the first frequency and the signal of the second frequency in response to a pressing force to a pen tip projecting from a housing, which is used for position pointing.

According to various embodiments of the present invention, at least two signals are produced by a pointing member, and information other than the position information such as pen pressure information is transmitted as a phase difference between the two signals. Alternatively, a pulse signal is produced by the pointing member and the pulse width of the pulse signal is controlled to transmit such information. Consequently, not only the position pointed to by the pointing member but also information other than the position information such as pen pressure information can be more readily detected.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 6A and 6B are flow charts illustrating operation procedures for carrying out position detection and pen pressure detection by the position detector;

FIGS. 7A to 7D are views illustrating a principle of position detection and pen pressure detection of the pointing member in a case wherein signals of first and second frequencies are transmitted at the same time;

FIG. 8 is a block diagram showing a schematic configuration of a pointing member of modification 1;

DETAILED DESCRIPTION

In the following, embodiments of a position detection apparatus of the present invention are described particularly with reference to the drawings. It is to be noted, however, that the present invention is not limited to the embodiments described below.

[Configuration of Position Detection Apparatus]

Figure 1:
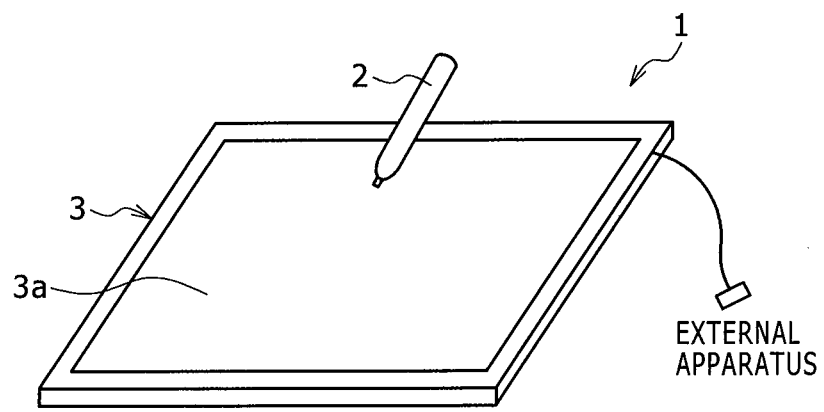
FIG. 1 is a perspective view of a position detection apparatus according to an embodiment of the present invention.

FIG. 1 shows a perspective view of an appearance of the position detection apparatus of one embodiment. It is to be noted that, in the present embodiment, a pen tablet is used as the position detection apparatus. The position detection apparatus 1 includes a pointing member 2 in the form of a pen, and a position detector 3 in the form of a flat plate.

The pointing member 2 is used on a scanning permitting region 3a of the position detector 3. On the scanning permitting region 3a, a pointed position (coordinate) pointed to by the pointing member 2 can be detected by the position detector 3.

The position detector 3 is connected to an external apparatus (for example, a computer apparatus or the like) not shown. The position detector 3 detects the position pointed to by the pointing member 2 and outputs position information to the external apparatus. Then, on a display screen (not shown) of the external apparatus, a pointer is displayed at a position corresponding to the position information received from the position detector 3.

[Configuration of Pointing Member]

Figure 2:
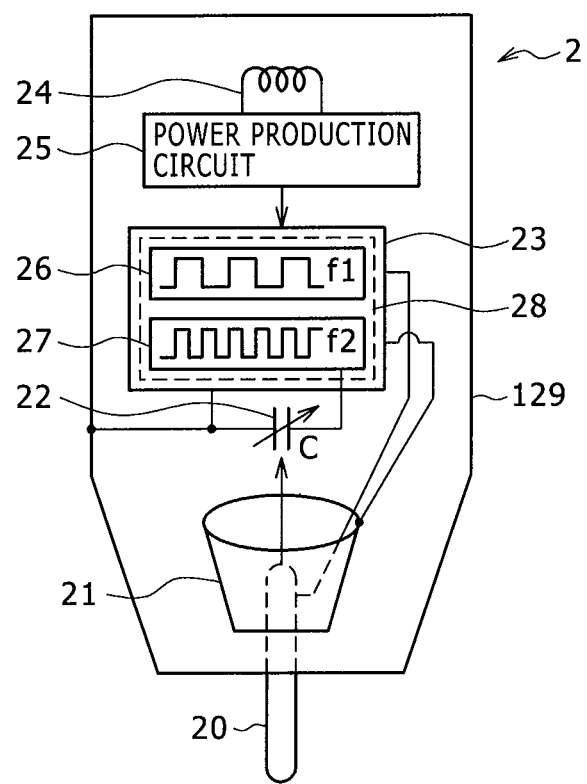
FIG. 2 is a block diagram showing a schematic configuration of a pointing member according to an embodiment of the present invention.

FIG. 2 shows a schematic configuration of the pointing member 2 of the present embodiment. The pointing member 2 includes a first electrode 20, a second electrode 21, a variable capacitor 22, an integrated circuit 23, a coil 24, a power production circuit 25 and a housing 129 made of, for example, a metal or conductive material and accommodating the components mentioned therein.

The first electrode 20 has a shape of a rod, and one end portion thereof is a pen tip which is disposed such that it projects from one end portion of the housing 129 and is formed from, for example, a metal or conductive material. In particular, the end portion projecting from the housing 129 functions as a pen tip of the pointing member 2 and functions also as the first electrode 20. Meanwhile, the second electrode 21 is an electrode of a substantially cylindrical shape and disposed in such a manner as to surround the first electrode 20. Further, the first electrode 20 and the second electrode 21 are connected to the integrated circuit 23 such that, when a high frequency signal is applied from the integrated circuit 23 to the first electrode 20 and the second electrode 21, a transmission signal produced by the integrated circuit 23 is transmitted to the position detector 3 through the first electrode 20 and the second electrode 21.

The variable capacitor 22 as a pen pressure detection element has a capacitance which varies in response to pressure applied to the pen tip, that is, pen pressure. In particular, if pressure is applied to the pen tip which forms the first electrode 20, then the pressure applied to the first electrode 20 is transmitted to one of a pair of electrodes (not shown) which form the variable capacitor 22. Therefore, if the first electrode 20 is pressed by the position detector 3 when the pointing member 2 is placed into contact with the position detector 3, then one of the electrodes of the variable capacitor 22 is pressed and a characteristic between the pair of electrodes of the variable capacitor 22 varies. As a result, the capacitance of the variable capacitor 22 varies. In other words, the capacitance of the variable capacitor 22 varies in accordance with the pen pressure. It is to be noted that the element for detecting the pen pressure may be formed using a variable coil or a variable resistor or using a resonance circuit including one of a variable capacitor, a variable coil, and a variable resistor.

The integrated circuit 23 includes a transmission signal production section 28 including a first frequency signal production section 26 and a second frequency signal production section 27. The integrated circuit 23 is connected at a ground terminal thereof to the housing 129. In the present embodiment, a high frequency signal (first transmission signal) of a first frequency f1 outputted from the first frequency signal production section 26 is used for position detection, and the high frequency signal (first transmission signal) of the first frequency f1 and another high frequency signal (second transmission signal) of a second frequency f2 outputted from the second frequency signal production section 27 are used for pen pressure detection. Further, outputs of the integrated circuit 23 are connected to the first electrode 20 and the second electrode 21 such that the signal of the first frequency f1 and the signal of the second frequency f2 are outputted to the first electrode 20 and the second electrode 21, respectively, at a predetermined timing. It is to be noted that, in the present embodiment, the first frequency f1 of the signal outputted from the first frequency signal production section 26 and the second frequency f2 of the signal outputted from the second frequency signal production section 27 are different from each other.

The second frequency signal production section 27 is configured for cooperation with the variable capacitor 22, and the generation timing of the signal at the second frequency f2 is controlled in response to a capacitance variation of the variable capacitor 22 as hereinafter described with reference to FIG. 5. Accordingly, the phase difference between the signal of the first frequency f1 outputted from the first frequency signal production section 26 and the signal of the second frequency f2 varies in response to the capacitance variation of the variable capacitor 22. In other words, in the present embodiment, the phase difference between the signal of the first frequency f1 and the signal of the second frequency f2 varies in response to the pressure applied to the pointing member 2.

Further, the integrated circuit 23 includes a control circuit (not shown) for controlling operation of the transmission signal production section 28, and for producing a clock signal and so forth necessary for operation control. It is to be noted that in the embodiment shown, the integrated circuit 23 is driven by power produced by the coil 24 and the power production circuit 25 described below.

The coil 24 receives an excitation signal from an excitation coil 35 of a sensor section 30 hereinafter described which forms the position detector 3. A high frequency signal is induced in the coil 24 with the excitation signal. Then, the induced high frequency signal is supplied to the power production circuit 25.

The power production circuit 25 has a rectification circuit (not shown). In the power production circuit 25, a high frequency signal received from the coil 24 is rectified and converted into a DC voltage by the rectification circuit. Then, the power production circuit 25 supplies the DC voltage obtained by the conversion as driving power to the integrated circuit 23.

[Configuration of Position Detector]

Figure 3:
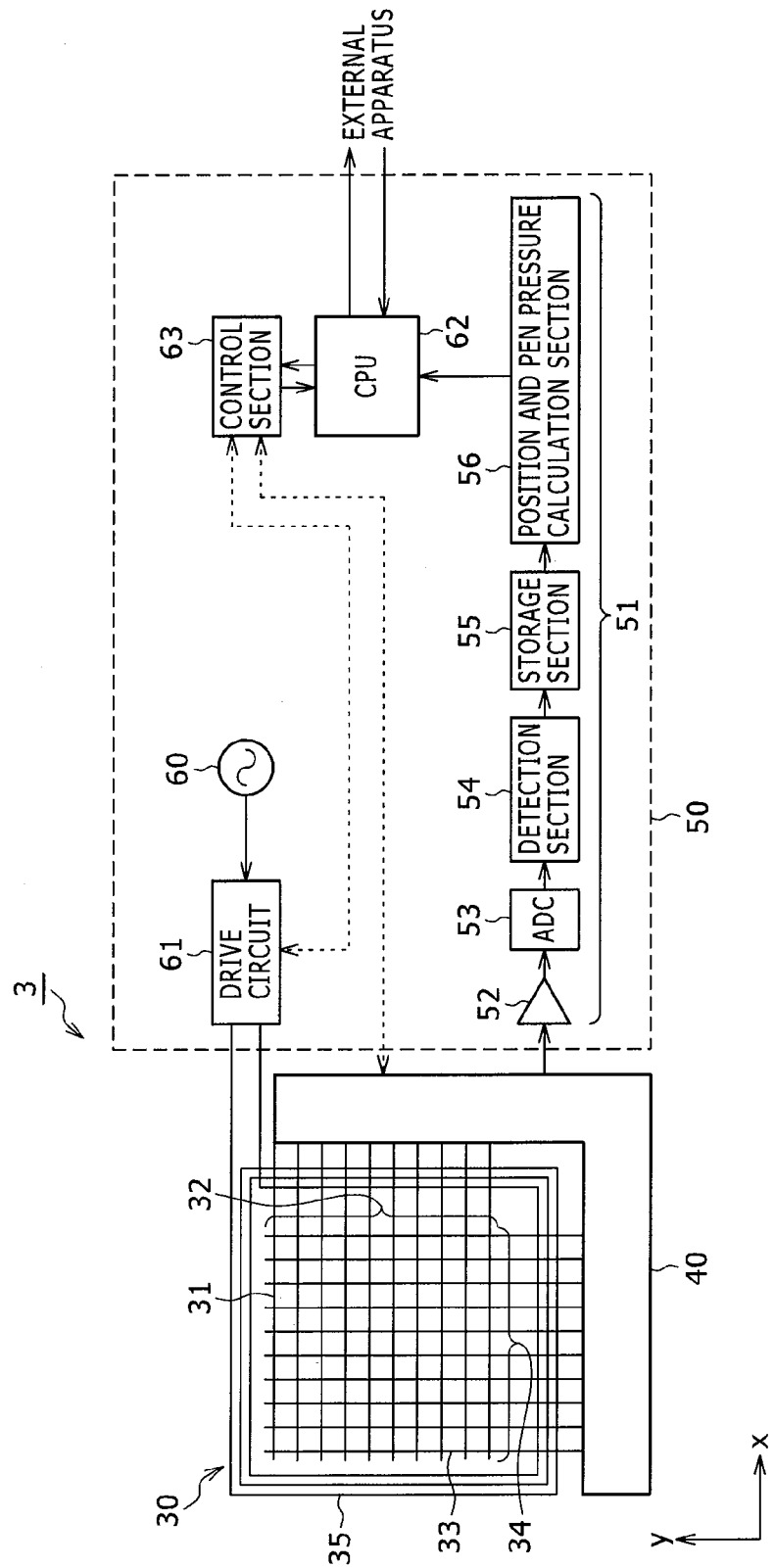
FIG. 3 is a block diagram showing a general configuration of a position detector according to an embodiment of the present invention.

FIG. 3 shows a schematic configuration of the position detector 3. The position detector 3 is composed principally of a sensor section 30 for detecting a position pointed to by the pointing member 2, a selection circuit 40 for selecting a plurality of conductors which form the sensor section 30, and a position detection circuit 50. It is to be noted that, in FIG. 3, a process flow of a reception signal is indicated by solid line arrow marks, and a process flow of a control signal, a clock signal and so forth are indicated by broken line arrow marks. It is to be noted, however, that, in FIG. 3, broken line arrow marks for indicating a process flow of a control signal, a clock signal and so forth for a reception system circuit group 51 are omitted for simplified illustration.

The sensor section 30 includes a first conductor group 32 including a plurality of first conductors 31 (first conductors) extending in an x direction (predetermined direction) in FIG. 3, a second conductor group 34 including a plurality of second conductors 33 (second conductors) extending in a direction perpendicular to the extending direction of the first conductors 31, that is, in a y direction in FIG. 3, and an excitation coil 35 provided around the conductor groups. The plural first conductors 31 which compose the first conductor group 32 are disposed in a predetermined spaced relationship from each other and in parallel to each other in the y direction in FIG. 3. Meanwhile, the plural second conductors 33 which compose the second conductor group 34 are disposed in a predetermined spaced relationship from each other and in parallel to each other in the x direction in FIG. 3.

It is to be noted that the first conductors 31 and the second conductors 33 are formed from transparent electrodes formed, for example, from an ITO (Indium Tin Oxide) film, copper foil and so forth. It is to be noted that the first conductor group 32 and the second conductor group 34 are laminated on a spacer, a glass substrate or the like (not shown) made of a resin material or the like. Also it is possible to dispose the first conductors 31 and the second conductors 33 in a matrix fashion on one of the faces of a substrate of glass or the like. In the case of the configuration just described, since it is possible to assure electric isolation between the first conductors 31 and the second conductors 33 by interposing an insulating material in a region in which the first conductors 31 and the second conductors 33 intersect with each other, the first conductors 31 and the second conductors 33 can be disposed substantially in the same layer on one of the faces of the substrate. The conductors which form the first conductor group 32 and the second conductor group 34 are connected to the selection circuit 40, and the excitation coil 35 is connected to a drive circuit 61 hereinafter described in the position detection circuit 50.

The number and the pitch of the first conductors 31 and the second conductors 33 are set suitably according to the size of the sensor section 30, the required detection accuracy and so forth. Further, while, in the present embodiment, the first conductors 31 and the second conductors 33 are illustrated as linear conductors, the present invention is not limited to this configuration. For example, both of the first conductors 31 and the second conductors 33 may meander in a direction in which they intersect with the extending direction thereof. Alternatively, for example, the first conductors 31 or the second conductors 33 may be formed from ring-shaped conductors while the others are formed from conductors which extend in radial directions from the center of the ring-shaped conductors.

The selection circuit 40 selects predetermined conductors from the first conductor group 32 and the second conductor group 34 in a predetermined order such as to select them sequentially. The conductor selection control by the selection circuit 40 is controlled according to a control signal (broken line arrow mark in FIG. 3) produced by a control section 63 hereinafter described in cooperation with a central processing section 62.

The position detection circuit 50 includes a reception system circuit group 51, an oscillator 60, a drive circuit 61, a central processing section 62 (CPU: Central Processing Unit), and a control section 63.

The reception system circuit group 51 includes a reception amplifier 52, an A/D (Analog to Digital) conversion circuit 53, a detection section 54, a storage section 55, and a position and pen pressure calculation section 56. The reception amplifier 52, A/D conversion circuit 53, detection section 54, storage section 55, and position and pen pressure calculation section 56 are connected in this order from the selection circuit 40 side.

The reception amplifier 52 amplifies a reception signal supplied from a predetermined conductor selected by the selection circuit 40. The reception amplifier 52 outputs the amplified reception signal to the A/D conversion circuit 53. The A/D conversion circuit 53 carries out an analog to digital conversion of the amplified reception signal and outputs the converted digital signal to the detection section 54.

The detection section 54 carries out a synchronous detection for the reception signal to detect a signal of the first frequency f1 and another signal of the second frequency f2. Then, the detection section 54 outputs the signal of the first frequency f1 and the signal of the second frequency f2 detected for each conductor to the storage section 55.

Figure 4:
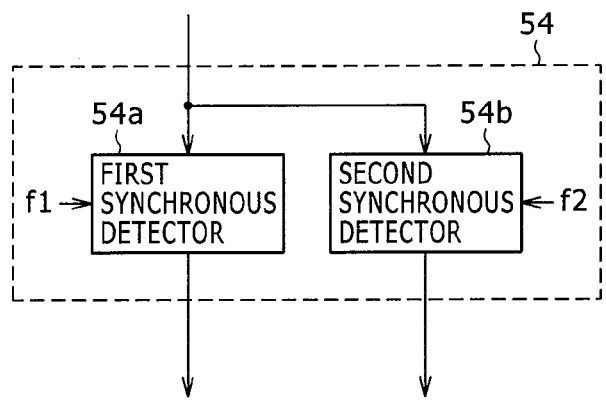
FIG. 4 is a block diagram showing a schematic configuration of a detection section.

FIG. 4 shows a schematic configuration of the detection section 54. Since, in the present embodiment, two different frequencies are used for a transmission signal to be transmitted from the pointing member 2 as described above, the detection section 54 is formed from two synchronous detectors (first synchronous detector 54a and second synchronous detector 54b). The first synchronous detector 54a receives the signal of the first frequency f1 used as a synchronizing signal that is inputted thereto, and extracts the signal of the first frequency f1 included in the reception signal. Likewise, the second synchronous detector 54b receives the signal of the second frequency f2 inputted thereto, and extracts the signal of the second frequency f2 included in the reception signal. It is to be noted that both of the first synchronous detector 54a and the second synchronous detector 54b can be formed from a synchronous detector which is conventionally used in the field of the communication techniques. It is to be noted that, while, in the present example, two synchronous detectors are provided in the detection section 54, the number of detectors to be provided in the detection section 54 corresponds to the number of frequencies included in the transmission signal transmitted from the pointing member 2. Further, the type of the detectors is not limited to a synchronous detector.

Referring back to FIG. 3, the position and pen pressure calculation section 56 uses the information of the frequencies stored in the storage section 55 to calculate a position (i.e., coordinate) pointed to by the pointing member 2 and the pen pressure of the pointing member 2. More particularly, the position and pen pressure calculation section 56 detects the level of the reception signal of the first frequency f1 and compares the level with a predetermined threshold value to recognize that the first frequency f1 has been transmitted from the pointing member 2 to carry out position detection of the pointing member 2. Similarly, the position and pen pressure calculation section 56 detects the level of the reception signal of the second frequency f2 and compares the level with a predetermined threshold value to recognize that the second frequency f2 has been transmitted from the pointing member 2. Also where some other frequency exists, a similar frequency recognition process is carried out. Further, the position and pen pressure calculation section 56 determines a phase difference between the reception signal of the first frequency f1 and the reception signal of the second frequency f2 and determines the pen pressure based on the phase difference.

The oscillator 60 outputs an AC signal of a predetermined frequency to the drive circuit 61. The drive circuit 61 converts the AC signal inputted thereto from the oscillator 60 into a current and supplies the current to the excitation coil 35.

The control section 63, which cooperates with the central processing section 62, outputs control signals (broken line arrow marks in FIG. 3) to the components in the position detection circuit 50 and outputs a result of the calculation of the position and pen pressure calculation section 56 to the external apparatus through the central processing section 62. It is to be noted that operation of the control section 63 is controlled by the central processing section 62.

[Operation of Position Detection Apparatus]

Now, operation of the position detection apparatus 1 of the present embodiment and a principle of position and pen pressure detection are described with reference to FIGS. 5 to 7. FIG. 5 is a view illustrating production of a phase difference corresponding to pen pressure of the pointing member according to an embodiment of the present invention. FIG. 6A and FIG. 6B are flow charts illustrating operation procedures for calculating position detection and pen pressure detection by the position detector. FIGS. 7A to 7D are views illustrating principles of the position detection and the pen pressure detection of the pointing member in a case wherein signals of the first and second frequencies are transmitted at the same time.

Figure 5:
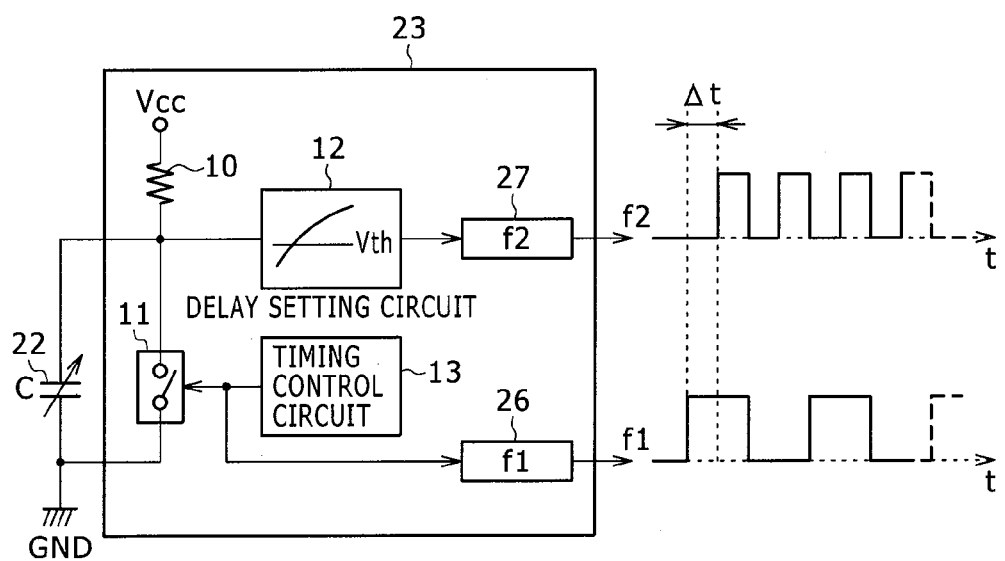
FIG. 5 is a view illustrating production of a phase difference corresponding to pen pressure by the pointing member according to an embodiment of the present invention.

FIG. 5 shows an example of a configuration of part of the integrated circuit 23 provided in the pointing member 2 shown in FIG. 2. The variable capacitor 22 whose capacitance C varies in response to a pressing force applied through the pen tip of the first electrode 20 is connected at one end thereof to the ground. The variable capacitor 22 is connected at the other end thereof to the power production circuit 25 through a resistor 10 so that a predetermined voltage Vcc is applied thereto. A switch 11 is connected in parallel across the variable capacitor 22. A timing control circuit 13 carries out ON/OFF control of the switch 11 in a predetermined period. In particular, the switch 11 is placed into an ON (i.e., closed) state once to discharge the charge of the variable capacitor 22, and thereafter is placed into an OFF (i.e., open) state.

The timing control circuit 13 places the switch 11 into an OFF state and instructs the first frequency signal production section 26 to produce a signal of the first frequency f1. If the switch 11 is placed into an OFF state, then since the variable capacitor 22 is gradually charged through the resistor 10, the potential across the variable capacitor 22 gradually rises according to the capacitance C which has varied in response to the pen pressure. A delay setting circuit 12 compares the potential at a node between the resistor 10 and the variable capacitor 22 with a predetermined threshold value Vth.

When the potential of the variable capacitor 22 rises to the predetermined threshold value Vth, the delay setting circuit 12 instructs the second frequency signal production section 27 to produce a signal of the second frequency f2. By this configuration, the time difference (Δt) between signal production of the signal of the first frequency f1 by the first frequency signal production section 26 and the signal of the second frequency f2 by the second frequency signal production section 27 (that is, the time difference between the signal of the first frequency f1 and the signal of the second frequency f2, that is, the phase difference between the two signals) varies depending on the capacitance C which has changed in response to the pen pressure applied to the pen tip. By detecting this phase difference, the pen pressure can be detected.

According to this configuration, also a state wherein the pen tip is spaced from the sensor section, that is, a hovering state, can be detected. In particular, the delay characteristic of the delay setting circuit 12 is set or the delay setting circuit 12 is configured such that, when no pressure is applied to the pen tip, the time difference (Δt) between the signal of the first frequency f1 and the signal of the second frequency f2 is longer (or shorter) than a time difference which is used normally for the pen pressure detection.

When the detected time difference between the signal of the first frequency f1 and the signal of the second frequency f2 remains within a predetermined range, the position detector 3 can recognize that the pointing member 2 touches the sensor section 30. On the other hand, by recognizing that the detected time difference between the signal of the first frequency f1 and the signal of the second frequency f2 is outside the predetermined range, the position detector 3 can detect that the pointing member 2 is in a hovering state. Further, if a time delay amount, which is longer than the period of the timing control circuit 13, is set for the delay setting circuit 12 so that, when no pressure is applied to the pen tip, no signal is output from the second frequency signal production section 27, then the position detector 3 can detect that the pointing member 2 is in a touching state or in a hovering state by recognizing presence or absence of a signal of the first frequency f1 and a signal of the second frequency f2. In particular, if it is detected that only one of a signal of the first frequency f1 and a signal of the second frequency f2 exists or does not exist, the position detector 3 can detect that the pointing member 2 is in a hovering state. If both of a signal of the first frequency f1 and a signal of the second frequency f2 are detected, then the position detector 3 can detect that the pointing member 2 is in a touching state.

Now, operation of the position detector 3 is described with reference to FIG. 6A and FIG. 6B as well as FIG. 7A to FIG. 7D. As shown in FIG. 7A, a signal of the first frequency f1 and a signal of the second frequency f2 are frequency multiplexed and transmitted from the pointing member 2. Further, the transmission operation of this frequency multiplexed signal is repeated after every predetermined period Δt1. By this configuration, the phase difference between the signal of the first frequency f1 and the signal of the second frequency f2 is detected, which depends on the capacitance C of the variable capacitor 22 corresponding to the pressing force (pressure) applied through the first electrode 20, after every predetermined period Δt1.

The position detector 3 carries out position detection of the pointing member 2 in the following manner. First, the selection circuit 40 selects a predetermined conductor from within a conductor group of the sensor section 30 (step S11). Then, the reception system circuit group 51 detects a reception signal Sp1 (refer to FIG. 7B) (step S12) and carries out amplification and analog to digital conversion of the reception signal Sp1.

Thereafter, the first synchronous detector 54a in the detection section 54 extracts a reception signal P1 of the first frequency f1 included in the reception signal. Then, the storage section 55 stores the reception signal P1 (refer to FIG. 7C) of the first frequency f1 outputted from the first synchronous detector 54a (step S13).

Then, the position detector 3 decides whether or not all of the conductors to be used for signal reception have been selected (step S14).

If all of the conductors to be used for signal reception have not been selected as yet, that is, if a NO determination is made at step S14, then the processing returns to the operation at step S11, and the reception system circuit group 51 detects the reception signal Sp1. Thereafter, the reception system circuit group 51 repeats the operation at steps S11 to S14 described above until the determination at step S14 becomes a YES determination.

Then, if all of the conductors to be used for signal reception have been selected, that is, if a YES determination is made at step S14, then the position and pen pressure calculation section 56 in the reception system circuit group 51 compares the signal level of the reception signal P1 of the first frequency f1 stored in the storage section 55 with a predetermined threshold value to detect the pointed position by the pointing member 2 (step S15).

Position detection of the pointing member 2 is carried out by the operation at steps S11 to S15 described above. Furthermore, the position detector 3 detects the pen pressure of the pointing member 2 in the following manner simultaneously with the position detection operation. Referring to FIG. 6B, the selection circuit 40 first selects a predetermined conductor from within a conductor group of the sensor section 30 (step S16). Then, the reception system circuit group 51 detects a reception signal Sp1 (refer to FIG. 7B) (step S17) and carries out amplification and analog to digital conversion of the reception signal Sp1.

Then, the second synchronous detector 54b in the detection section 54 extracts a reception signal P2 of the second frequency f2 included in the reception signal. Then, the storage section 55 stores the reception signal P2 (refer to FIG. 7D) of the second frequency f2 outputted from the second synchronous detector 54b (step S18).

Then, the position detector 3 decides whether or not all of the conductors to be used for signal reception have been selected (step S19).

If all of the conductors to be used for signal reception have not been selected as yet, that is, if a NO decision is made at step S19, then the processing returns to the operation at step S16, and the reception system circuit group 51 detects the reception signal. Thereafter, the reception system circuit group 51 repeats the operation at steps S16 to S19 described above until the decision at step S19 changes to a YES decision.

Then, if all of the conductors to be used for signal reception have been selected, that is, if a YES decision is made at step S19, then the position and pen pressure calculation section 56 in the reception system circuit group 51 reads out the reception signals P1 of the first frequency f1 and the reception signals P2 of the second frequency f2 stored in the storage section 55 and calculates a phase difference between the reception signals of the different frequencies. Then, the position and pen pressure calculation section 56 detects the pen pressure of the pointing member 2 based on the calculated phase differences (step S20).

By the simultaneous operation of steps S11 to S15 and steps S16 to S20, the position detection and the pen pressure detection of the pointing member 2 are carried out. In short, if the reception signal Sp1 is supplied to the detection section 54, then a reception signal P1 of the first frequency f1 included in the reception signal Sp1 is extracted by the first synchronous detector 54a, and a reception signal P2 of the second frequency f2 included in the reception signal Sp1 is extracted by the second synchronous detector 54b (refer to FIG. 7C and FIG. 7D). Accordingly, even if a signal of the first frequency f1 and a signal of the second frequency f2 are transmitted at the same time from the pointing member 2, the reception signal P1 of the first frequency f1 and the reception signal P2 of the second frequency f2 are extracted separately from each other by the detection section 54.

Therefore, the position pointed to by the pointing member 2 can be detected by comparing the level of the reception signal P1 of the first frequency f1 outputted from the first synchronous detector 54a with a predetermined threshold value within the detection period Δt1. Further, in the present example, the pen pressure of the pointing member 2 can be detected by calculating the phase difference between the reception signal P1 of the first frequency f1 outputted from the first synchronous detector 54a and the reception signal P2 of the second frequency f2 outputted from the second synchronous detector 54b. It is to be noted that the circuit for detecting a phase difference between two signals is a well-known technique, and therefore, description of the same is omitted.

It is to be noted that, once the series of processes represented by the steps S11 to S15 and S16 to S20 end, the position detector 3 stands by until after the detection period Δt1 elapses as measured from the start of the operation for the position detection and the pen pressure detection, and thereafter, the processes at steps S11 to S15 and S16 to S20 are repeated.

As described above, the present embodiment has the configuration wherein two transmission signals of different frequencies are transmitted from the pointing member 2 and are received by the position detector 3 and the position pointed to by the pointing member 2 is detected based on at least one of the transmission signals and further has the configuration wherein the phase difference between the two transmission signals is determined. Therefore, information other than the position information such as pen pressure information can be readily detected.

While, in the embodiment described above, two signals having different frequencies from each other (a first signal of the first frequency f1 and a second signal of the second frequency f2) are transmitted from the pointing member 2 in order to determine the position and the pen pressure of the pointing member 2, the present invention is not limited to this configuration. It is also possible to use a signal of the first frequency f1 and a signal of the second frequency f2 transmitted from a pointing member to detect not only the position of the pointing member but also information regarding, for example, whether or not a pointing member is in contact with the sensor section (such information is hereinafter referred to as pen down information).

Referring back to FIG. 2, in the configuration wherein a signal of the first frequency f1 and a signal of the second frequency f2 are transmitted at the same time, the phase difference between the signal of the first frequency f1 and the signal of the second frequency f2 transmitted from the pointing member 2 varies in response to the variation in capacitance of the variable capacitor 22 due to the fact that the first electrode 20 is pressed, and the pen pressure is detected from the variation of the phase difference. Accordingly, with the present configuration, the presence or absence of a pen down state can be recognized by detecting the phase difference. In particular, if the phase difference between the signal of the first frequency f1 and the signal of the second frequency f2 when the first electrode is not pressed indicates no variation, then it can be recognized that the pointing member 2 is not in a pen down state, but if the phase difference indicates some variation, then it can be recognized that the pointing member 2 is in a pen down state.

[Modification 1]

Another example of acquisition of pen down information is described with reference to FIG. 8. The present example includes a configuration for controlling transmission of a signal of the first frequency f1 and a signal of the second frequency f2 in response to whether or not the first electrode 20 is pressed. In particular, the present example includes a configuration wherein, when the first electrode 20 is not pressed, a signal of the second frequency f2 is not transmitted. The modification 1 described below is an example wherein a signal of the first frequency f1 and a signal of the second frequency f2 transmitted from a pointing member are used to detect the position of the pointing member, and a state wherein the pointing member is positioned in the proximity of the sensor section (hovering state) and another state wherein the pointing member is in contact with the sensor section (pen down state).

FIG. 8 shows a schematic configuration of the pointing member of the present example. It is to be noted that like elements to those in the embodiment (FIG. 2) described above are denoted by like reference characters.

The pointing member 100 of the present example includes a first electrode 20 in the form of a rod, a switch 101 (first switch), an integrated circuit 102, a coil 24, a power production circuit 25, and a housing 129 made of a metal or conductive material and accommodating the components mentioned therein. The components other than the switch 101 and the integrated circuit 102 are similar to those in the embodiment described hereinabove, and therefore, the configuration only of the switch 101 and the integrated circuit 102 is described here.

The switch 101 is connected at one end thereof to a control terminal provided on a changeover switch 103 in the integrated circuit 102 hereinafter described for controlling changeover (switching) operation and at the other end thereof to the housing 129. Further, the switch 101 has a structure engaged with the first electrode 20 and is configured such that the switch 101 is placed into an ON state if the first electrode 20 is depressed by the sensor section.

The integrated circuit 102 includes a transmission signal production section 28 which in turn includes a first frequency signal production section 26 and a second frequency signal production section 27, and a changeover switch 103 (second switch). It is to be noted that the transmission signal production section 28 has a configuration similar to that in the embodiment described above. Further, the integrated circuit 102 is connected at the ground terminal thereof to the housing 129.

The changeover switch 103 is connected at an input terminal thereof to output terminals of the first frequency signal production section 26 and the second frequency signal production section 27 and at an output terminal thereof to the first electrode 20. The changeover switch 103 selects which one of the signal of the first frequency f1 and the signal of the second frequency f2 is to be transmitted. The changeover operation of the changeover switch 103 is controlled in accordance with a connection state of the switch 101, that is, with an ON state or an OFF state of the switch 101. In particular, when the switch 101 is in an OFF state, that is, when the pointing member 100 is in a hovering state wherein it is afloat above the sensor section 30, the changeover switch 103 is connected to the first frequency signal production section 26. When the switch 101 is in an ON state, that is, when the pointing member 100 is in a pen down state wherein the pointing member 100 is in contact with the sensor section 30, the changeover switch 103 is connected to the second frequency signal production section 27.

Where the pointing member 100 is spaced above the sensor section 30, that is, where the pointing member 100 is in a hovering state, the signal of the first frequency f1 is transmitted from the pointing member 100 to the sensor section 30. The detection section 54 determines that the pointing member 100 is in a hovering state from the fact that the reception signal P1 of the first frequency f1 is detected or the fact that the reception signal P2 of the second frequency f2 is not detected, and carries out position detection of the pointing member 100 in a hovering state based on detection of the reception signal P1 of the first frequency f1. On the other hand, where the pointing member 100 is in contact with the sensor section 30, the signal of the second frequency f2 is transmitted to the sensor section 30 through the changeover switch 103 in place of the signal of the first frequency f1. The present modification 1 can be formed otherwise such that the detection section 54 can determine that the pointing member 100 is in a pen down state from the fact that the reception signal P2 of the second frequency f2 is detected or the fact that the reception signal P1 of the first frequency f1 is not detected, and carries out position detection of the pointing member 100 in a pen down state based on detection of the reception signal P2 of the second frequency f2. In other words, in the example just described, it can be determined whether or not the pointing member 100 is in contact with the sensor section 30 by ascertaining the frequencies of the signals transmitted from the pointing member 100.

[Modification 2]

The modification 2 presents an example of a configuration of a pointing member which can use three signals of different frequencies including a signal of a first frequency f1, another signal of a second frequency f2, and a further signal of a third frequency f3 transmitted from the pointing member to detect a position of the pointing member, pen pressure, and operation information regarding a side switch provided on the pointing member.

Figure 9:
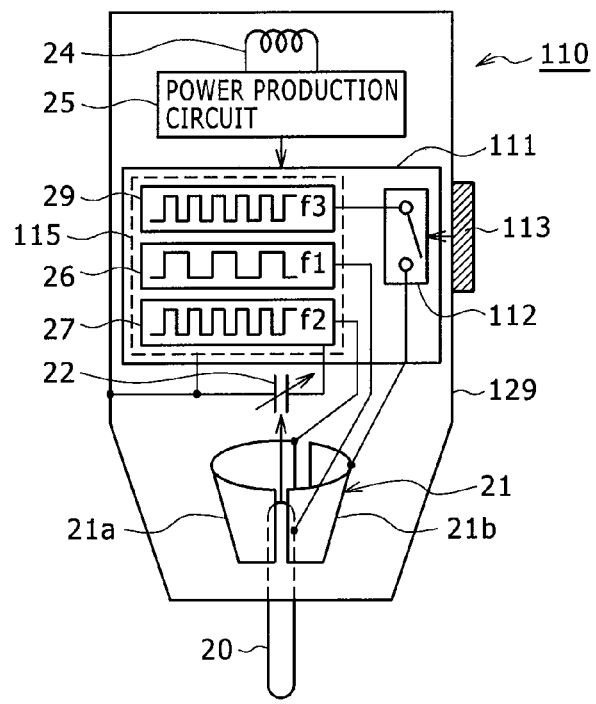
FIG. 9 is a block diagram showing a schematic configuration of a pointing member of modification 2.

FIG. 9 shows a schematic configuration of the pointing member of the present example. It is to be noted that, in FIG. 9, like elements to those in the embodiment shown in FIG. 2 are denoted by like reference characters.

The pointing member 110 in the present example includes a first electrode 20 in the form of a rod, a second electrode 21 including a second electrode 21a of a substantially semicircular cylindrical shape and a second electrode 21b of a substantially semicircular cylindrical shape, a variable capacitor 22, an integrated circuit 111, a coil 24, a power production circuit 25, a housing 129 accommodating the components mentioned therein and made of, for example, a metal or conductive material, and an operation switch provided at a portion of a side face of the housing 129 for operation by a finger or the like, that is, a so-called side switch 113. The components other than the integrated circuit 111, side switch 113, second electrode 21a of the substantially semicircular cylindrical shape and second electrode 21b of the substantially semicircular cylindrical shape are similar to those of the embodiment described hereinabove, and therefore, description is given here only of the configuration of the integrated circuit 111, side switch 113, second electrode 21a of the substantially semicircular cylindrical shape and second electrode 21b of the substantially semicircular cylindrical shape.

The integrated circuit 111 includes a transmission signal production section 115 including a first frequency signal production section 26, a second frequency signal production section 27, a third frequency signal production section 29, and a changeover switch 112.

In the present example, the transmission signal production section 115 includes the third frequency signal production section 29 in addition to the first frequency signal production section 26 and the second frequency signal production section 27. A signal of the first frequency f1 outputted from the first frequency signal production section 26 is supplied to the first electrode 20. A signal of the second frequency f2 outputted from the second frequency signal production section 27 is supplied to the second electrode 21a of the substantially semicircular cylindrical shape. A signal of the third frequency f3 outputted from the third frequency signal production section 29 is supplied to the second electrode 21b of the substantially semicircular cylindrical shape through the changeover switch 112. As described hereinabove, the position on the sensor section pointed to by the pointing member 110 is detected from the signal of the first frequency f1 produced by the first frequency signal production section 26. Further, as described hereinabove with reference to FIG. 5, the pressure applied to the pointing member 110, so-called pen pressure, is detected from a variation of the capacitance of the variable capacitor when the first electrode 20 in the form of a rod presses the variable capacitor 22 in response to the pen pressure. In other words, when the capacitance of the variable capacitor varies, the production timing of the signal of the second frequency f2 produced by the second frequency signal production section 27 with respect to the signal of the first frequency f1 produced by the first frequency signal production section 26 varies. Accordingly, the pen pressure can be detected by detecting the phase difference between the signal of the first frequency f1 and the signal of the second frequency f2 at the position detection circuit side.

The changeover switch 112 is connected at one end of an input terminal thereof to an output terminal of the third frequency signal production section 29 and at the other terminal thereof to the second electrode 21b of the substantially semicircular cylindrical shape which composes the second electrode 21. The changeover switch 112 selectively supplies the signal of the third frequency f3 to the second electrode 21b of the substantially semicircular cylindrical shape in response to an operation of the side switch 113.

The side switch 113 is provided to implement, for example, a function of the right click button or the left click button of a mouse used in a personal computer and acts upon the changeover switch 112 in the integrated circuit 111 to control the changeover operation of the changeover switch 112.

In the pointing member 110 having such a configuration as described above, the production timing of a signal of the second frequency f2 to be transmitted from the second frequency signal production section 27 with respect to a signal of the first frequency f1 to be transmitted from the first frequency signal production section 26 varies in response to the pen pressure, that is, to the variation of the capacitance of the variable capacitor 22, and the phase between the signals varies thereby and the pen pressure can be detected. Further, in the pointing member 110, by depressing the side switch 113 into an ON state, the changeover switch 112 is controlled so that a signal of the third frequency f3 produced by the third frequency signal production section 29 is transmitted to the position detector side through the second electrode 21b of the substantially semicircular cylindrical shape.

On the position detection circuit side, an operation of the side switch 113 can be detected by detection of the presence of the signal of the frequency f3. It is to be noted that, while, in the present example, the second electrode 21 has a configuration wherein it is divided into two parts including the second electrode 21a of the substantially semicircular cylindrical shape and the second electrode 21b of the substantially semicircular cylindrical shape, the configuration of the second electrode 21 is not limited to this configuration. For example, where the first frequency f1 and the second frequency f2 are used, the second electrode 21 may be divided into four parts such that each two divisional electrodes which are opposed to each other are paired with each other and signals having the same frequency are supplied to the electrode parts which form each pair. Where the first frequency f1, second frequency f2 and third frequency f3 are used, the second electrode 21 may be divided into six parts such that each two divisional electrodes which are opposed to each other are paired with each other and signals having the same frequency are supplied to the electrode parts which form each pair. In short, the second electrode 21 is divided into a predetermined number of parts corresponding to the number of frequencies to be used and every two electrode parts disposed at predetermined positions are paired with each other and signals having the same frequency are supplied to the electrode parts which form each pair. With this configuration, the position dependency of an outer peripheral face of the pointing member with respect to the sensor section 30, that is, the physical distance relationship of the electrode parts with respect to the sensor section 30, can be reduced. It is to be noted that, in the description above, the signal of the first frequency f1 is supplied to the first electrode 20 and the signal of the second frequency f2 is supplied to the second electrode 21a while the signal of the third frequency f3 is supplied to the second electrode 21b. However, as another example wherein the signals are transmitted through predetermined electrodes, since the signals have frequencies which can be discriminated from one another, it is also possible to supply the signals to a desired electrode after the signals are added through a resistor or the like. For example, it is also possible to add the signal of the first frequency f1, the signal of the second frequency f2, and the signal of the third frequency f3 through a resistor and supply the added signal to the first electrode 20. It is also possible to add the signal of the second frequency f2 and the signal of the third frequency f3 through a resistor and supply the added signal to the second electrode 21 shown in FIG. 2 or the second electrode 21a and/or the second electrode 21b shown in FIG. 9.

[Modification 3]

In the position detector 3 of the embodiment described above, the selection circuit 40 selects a predetermined conductor from within the first conductor group 32 and the second conductor group 34. However, the present invention is not limited to this configuration. The selection circuit may be formed from two selection circuits such that one of the selection circuits selects a predetermined conductor from within the first conductor group 32 while the other one is used as a selection circuit for selecting a predetermined conductor from within the second conductor group 34. In the modification 3, such a configuration is described.

Figure 10:
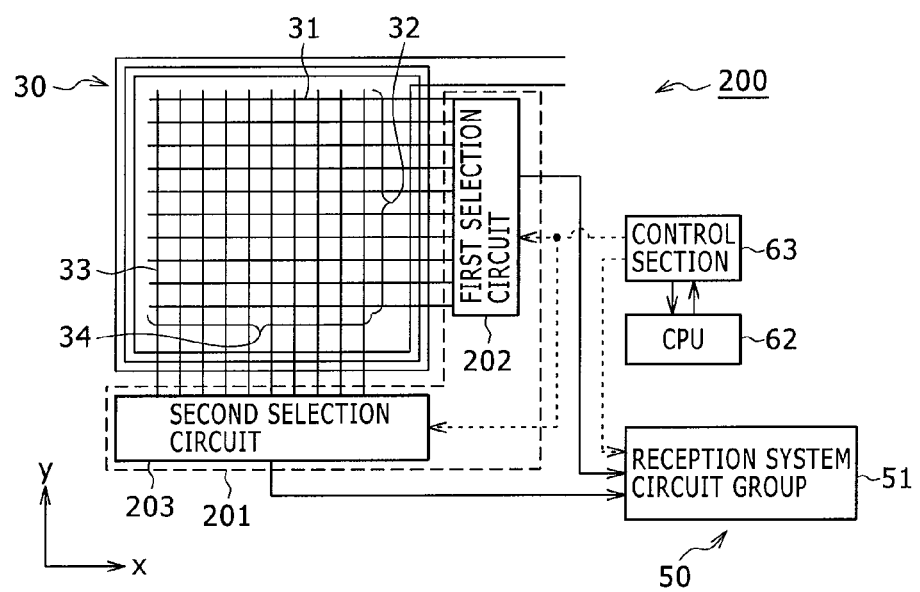
FIG. 10 is a block diagram showing a schematic configuration of a position detector of modification 3.

FIG. 10 shows a schematic configuration of the position detector of the modification 3. It is to be noted that, in FIG. 10, like elements to those in the embodiment shown in FIG. 3 are denoted by like reference characters. Further, in FIG. 10, only components around a selection circuit 201 are shown in order to simplify illustration.

The selection circuit 201 of the position detector 200 of the present example is composed of a first selection circuit 202 for selecting a predetermined first conductor 31 in a predetermined order from within a first conductor group 32 and a second selection circuit 203 for selecting a second conductor 33 in a predetermined order from within the second conductor group 34. Further, the first selection circuit 202 and the second selection circuit 203 are connected to a reception system circuit group 51. It is to be noted that the components of the position detector 200 of the present example other than the selection circuit 201 are similar to those in the embodiment described above.

In the position detector 200 of the present example, operation of the first selection circuit 202 which selects a predetermined first conductor 31 from within the first conductor group 32 and operation of the second selection circuit 203 which selects a predetermined second conductor 33 from within the second conductor group 34 are carried out under the control of the control section 63 which operates in cooperation with the central processing section 62. In this instance, an output signal of the first selection circuit 202 and an output signal of the second selection circuit 203 are inputted to the reception system circuit group 51. In the present example, the signal supplied from the first selection circuit 202 and the signal supplied from the second selection circuit 203 are superposed with each other in the inside of the reception system circuit group 51, and detection of the position pointed to by the pointing member and pen pressure detection are carried out in response to the selection of a first conductor 31 and a second conductor 33 under the control of the control section 63. It is to be noted that the changeover operation between the first selection circuit 202 and the second selection circuit 203 is controlled with a control signal outputted from the control section 63.

According to the configuration of the present example, since the first selection circuit 202 and the second selection circuit 203 are separated from each other, the first conductor group 32 and the second conductor group 34 can be placed into a signal reception state at the same time. Accordingly, with the present configuration, the detection speed can be improved. Further, the selection circuits can be formed from a circuit of a small scale and the degree of freedom in circuit layout of the position detector 200 increases.

In the configuration of the position detector 200 of the modification 3, the reception system circuit group 51 adds up output signals formed from signals of different frequencies from each other, for example, through a resistor or the like so that they are processed as a single signal. On the other hand, it is also possible to provide a reception system circuit group for processing an output signal of the first selection circuit 202 and a reception system circuit group for processing an output signal of the second selection circuit 203 separately from each other. In this instance, each of the two reception system circuit groups may carry out both of the position detection of the pointing member and the pen pressure, or it is also possible to adopt a configuration wherein position detection of the pointing member is carried out by both of the reception system circuit groups while the pen pressure detection of the pointing member is carried out by one of the reception system circuit groups. Where the latter is adopted, the configuration thereof is simplified from the configuration of the former.

[Modification 4]

In the embodiment and the modifications 1 to 3 described above, the position detection apparatus is a pen tablet. However, the present invention is not limited to this configuration. The position detection apparatus can include not only a function of a pen tablet but also a function of a touch panel wherein a user touches with his finger the screen of the position detector to carry out a predetermined function. The modification 4 describes a position detection apparatus which serves as both a pen tablet and a touch panel. In particular, where the position detection apparatus is used to detect a pen as a pointing member, the conductors which compose the first conductor group 32 and the conductors which compose the second conductor group 34 are individually caused to function as reception conductors. However, where the position detection apparatus is used to detect a finger as a pointing member different in type from a pen, the conductors which compose the first conductor group 32 or the conductors which compose the second conductor group 34 are caused to function as transmission conductors and predetermined signals are supplied to the conductors while the other conductors are caused to function as reception conductors.

Figure 11:
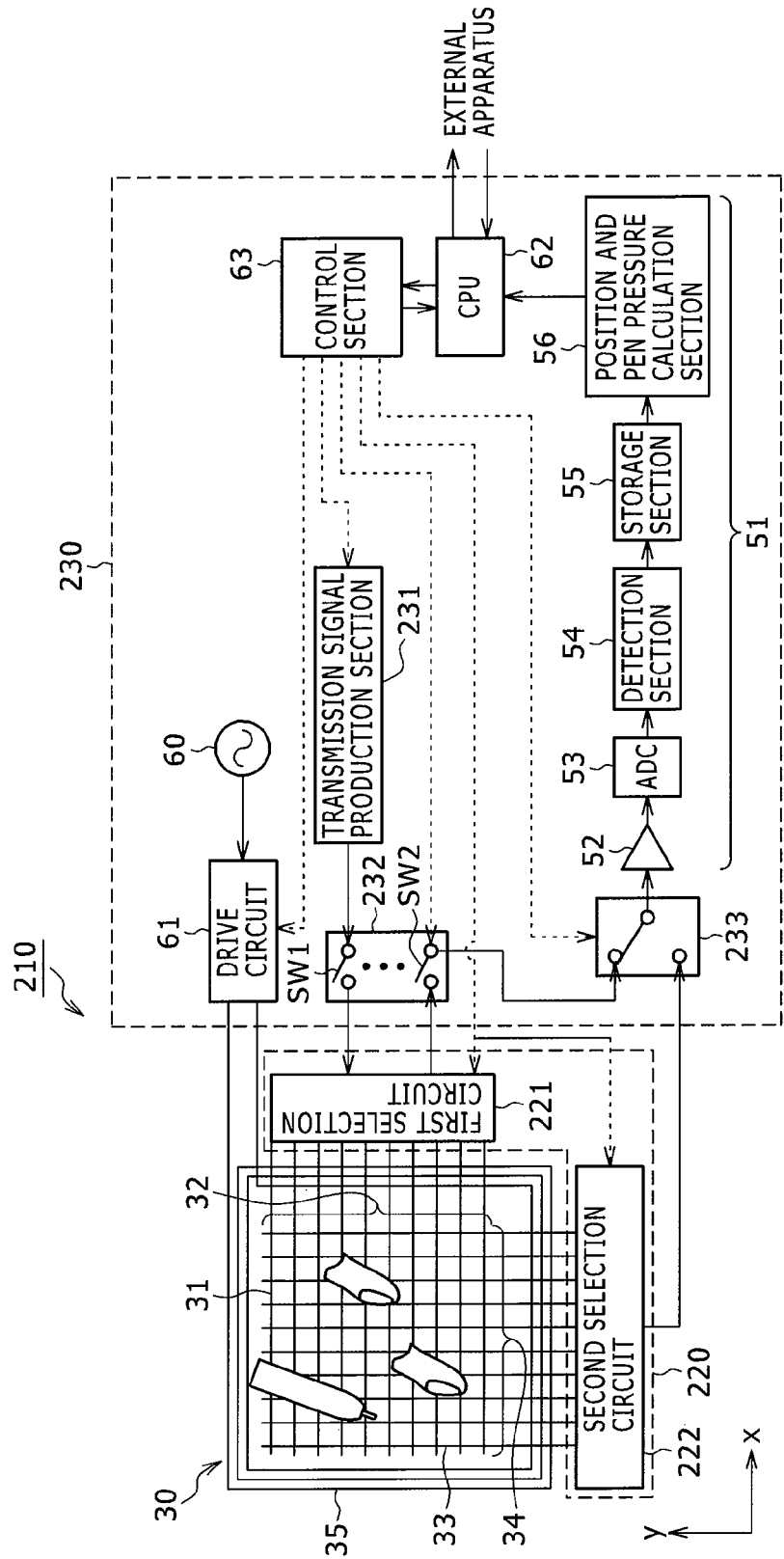
FIG. 11 is a block diagram showing a schematic configuration of a position detector of modification 4.

FIG. 11 shows a schematic configuration of a position detector in the position detection apparatus of the present example. It is to be noted that, in the position detection apparatus of the present example, any one of the embodiment and the modifications 1 and 2 described above can be used as a pen forming the pointing member. Therefore, only the configuration of the position detector is described. It is to be noted that, in FIG. 11, like elements to those in the embodiment shown in FIG. 3 are denoted by like reference characters. Further, in FIG. 11, a process flow of a reception signal is indicated by a solid line arrow mark, and a process flow of a control signal, a clock signal, or the like is indicated by a broken line arrow mark. It is to be noted, however, that, in FIG. 11, broken line arrow marks indicative of flows of a control signal, a clock signal and so forth of the reception system circuit group 51 are omitted to simplify illustration. Further, in the present example, the position detection apparatus has a configuration which can detect not only a pen but also one or a plurality of different kinds of pointing members such as a finger substantially at the same time.

The position detector 210 in the present example is principally composed of a sensor section 30 for detecting positions pointed to by a plurality of pointing members different in type such as a pen and one or more fingers, a selection circuit 220 for selecting a plurality of conductors which compose the sensor section 30, and a position detection circuit 230. It is to be noted that, since the sensor section 30 has a configuration similar to that of the embodiment shown in FIG. 3, description of the configuration of the sensor section 30 is omitted here. It is to be noted that, in the present example, the pointing member is not limited to a pen but includes one or a plurality of fingers, the palm of a hand, and so forth.

The selection circuit 220 is formed from a first selection circuit 221 and a second selection circuit 222. The first selection circuit 221 is connected to a first conductor group 32 composed of a plurality of first conductors 31 disposed in parallel to each other in the y direction in FIG. 11 and selects a predetermined first conductor 31 in a predetermined order from within the first conductor group 32. Meanwhile, the second selection circuit 222 is connected to a second conductor group 34 composed of a plurality of second conductors 33 disposed in parallel to each other in the x direction in FIG. 11 and selects a predetermined second conductor 33 in a predetermined order from within the second conductor group 34. It is to be noted that the changeover control of the first selection circuit 221 and the second selection circuit 222 is controlled with a control signal outputted from a control section 63 which cooperates with a central processing section 62. As an example of the conductor selection procedure, the first selection circuit 221 first selects a predetermined first conductor 31 which composes the first conductor group 32 and the second selection circuit 222 successively selects the second conductors 33 which compose the second conductor group 34 in a predetermined order. If all of the second conductors 33 which compose the second conductor group 34 are selected, then the first selection circuit 221 selects a next first conductor 31 in a predetermined procedure, and the second control circuit 222 successively selects the second conductors 33 which compose the second conductor group 34 in a predetermined procedure. If such a conductor selection procedure as described above is repeated, then pointing members different in type such as a pen and a finger placed on the sensor section 30 can be detected substantially at the same time.

The position detection circuit 230 includes a reception system circuit group 51, an oscillator 60, a drive circuit 61, a central processing section 62, a control section 63, a transmission signal production section 231, a first changeover (switching) section 232, and a second changeover (switching) section 233. The position detection circuit 230 includes the transmission signal production section 231, first changeover section 232 and second changeover section 233 in addition to the components of the position detection circuit 50 of the embodiment shown in FIG. 3. The components other than the transmission signal production section 231, first changeover section 232 and second changeover section 233 are similar to those of the embodiment described above.

When the position detector 210 is use to operate as a touch panel which accepts an operation by a finger, the transmission signal production section 231 produces a transmission signal to be supplied to a predetermined first conductor 31 in the first conductor group 32. It is to be noted that, while the transmission signal production section 231 preferably produces a signal having a new third frequency f3 different from the frequencies such as the first frequency f1 and the second frequency f2 transmitted from a pointing member in the form of a pen, it may have any configuration as long as a finger operation and a pen operation can be recognized. In other words, the configuration of the transmission signal production section 231 is not limited to that described above but may be any configuration as long as the type of each pointing member such as a pen or a finger can be identified through identification based on frequency information, identification based on phase information, or time-divided identification of operations of a pen and a finger. Further, when the position detection apparatus operates as a touch panel, at a position at which a finger of a user contacts the sensor section, current is shunted to the ground, for example, through a finger, or current movement between crossing conductors occurs, and consequently the level of a reception signal obtained through a crossing point of conductors at the touched position varies. Therefore, it is possible to detect the level variation to detect the touched position two-dimensionally.

The first changeover section 232 changes over (or switches between) a flow of a signal when the position detector 210 is caused to operate as a pen tablet which accepts an operation of a pointing member in the form of a pen, and a flow of a signal when the position detector 210 is caused to operate as a touch panel which accepts an operation by a finger as a pointing member. In particular, when the position detector 210 is caused to operate as a pen tablet, the first conductor group 32 acts as reception conductors, and therefore, the output terminal of the first selection circuit 221 is connected to one of the input terminals of the second changeover section 233 through a switch SW2 of the first changeover section 232. Meanwhile, a switch SW1 of the first changeover section 232 operates in an interlocking relationship with the switch SW2 to place the transmission signal production section 231 and the first selection circuit 221 into a non-connected state. When the position detector 210 is caused to operate as a touch panel, since the first conductor group 32 acts as transmission conductors, the output terminal of the transmission signal production section 231 is connected to the first selection circuit 221 through the switch SW1 of the first changeover section 232. Meanwhile, the switch SW2 of the first changeover section 232 operates in an interlocking relationship with the switch SW1 to place the first selection circuit 221 and one of the input terminals of the second changeover section 233 into a non-connected state. It is to be noted that the changeover operation of the first changeover section 232 and the second changeover section 233 is controlled with a control signal (broken line arrow mark in FIG. 11) outputted from the control section 63 which cooperates with the central processing section 62. Further, when the position detector 210 is caused to operate as a touch panel which accepts an operation by a finger, the second changeover section 233 cooperates with a connection operation between the transmission signal production section 231 and the first selection circuit 221 through the first changeover section 232 under the control of the control section 63 which cooperates with the central processing section 62 so that the second selection circuit 222 is connected to the reception amplifier 52 through the other input terminal of the second changeover section 233. Since the first changeover section 232 and the second changeover section 233 are controlled in this manner, transmission signals produced by the transmission signal production section 231 are successively supplied to the first conductors 31 which compose the first conductor group 32 through the first selection circuit 221 and the second conductors 33 which compose the second conductor group 34 are successively selected and connected to the reception amplifier 52 by the second selection circuit 222. By this, an operation by a finger can be detected two-dimensionally. On the other hand, when the position detector 210 is caused to operate as a pen tablet which accepts an operation of a pen, the second changeover section 233 alternately connects the first selection circuit 221 through the first changeover section 232 and the second selection circuit 222 to the reception amplifier 52 under the control of the control section 63. Where the first changeover section 232 and the second changeover section 233 are controlled in this manner, an operation of a pen can be detected two-dimensionally.

Figure 12:
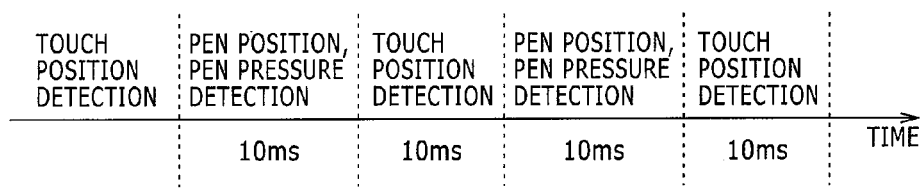
FIG. 12 is a view illustrating operation of the position detector of the modification 4.

Here, an example of operation of a function of the position detection apparatus of the present example as a touch panel and a function as a pen tablet is described. An example of the operation is illustrated in FIG. 12. In the example illustrated in FIG. 12, operation as a touch panel and operation as a pen tablet are changed over after every predetermined interval of time. In particular, the first changeover section 232 and the second changeover section 233 are changed over in an interlocking relationship with each other after every predetermined interval of time under the control of the control section 63 to detect presence of pointing members such as a finger and a pen or to determine a position pointed to by a pointing member. In the present example, a pen position and pen pressure detection operation (pen tablet function) and a touched position detection operation (touch panel function) are repeated alternately at predetermined time intervals (for example, 10 ms). Further, while the position detection apparatus of the present example has a configuration which periodically changes from operating as a touch panel for detecting a finger as a pointing member to operating as a pen tablet for detecting a pen as a pointing member of a different type, with whichever function the position detection apparatus operates, the second conductors 33 which compose the second conductor group 34 are always used for signal reception. Accordingly, the reception system circuit group 51 has a circuit configuration which can simultaneously detect a transmission signal supplied from the transmission signal production section 231 used for detection of a finger and a transmission signal supplied from a pen so that, when the finger position in the x direction is determined, also the pen position in the x direction is determined at the same time. In particular, in regard to the x direction, if not only the finger position but also the pen position are determined simultaneously, then in a next process for determination of the pen position, it is only necessary to detect the pen position in the y direction since the pen position in the x direction is acquired already. Where such a circuit configuration as described above is provided, simultaneous detection of a pen and a finger by the sensor section 30 can be carried out at a high speed.

It is to be noted that the operation of the position detection apparatus of the present example is not limited to the time-divided operation exhibited by the example illustrated in FIG. 12. For example, it is also possible to simultaneously detect presence of a finger and a pen on the sensor section 30 without adopting the time-divided operation. Where it is assumed that a signal of a first frequency and another signal of a second frequency different from the first frequency are transmitted from a pen, the transmission signal production section 231 in FIG. 11 produces transmission signals including a signal of a third frequency different from the frequencies mentioned and supplies the transmission signals of the third frequency in a predetermined order repetitively to a plurality of first conductors 31 which compose the first conductor group 32 through the switch SW1 of the first changeover section 232 and the first selection circuit 221. To the reception amplifier 52 which is part of the reception system circuit group 51, selected conductors are connected through the second selection circuit 222 and the second changeover section 233. It is to be noted that the second selection circuit 222 selects a predetermined conductor according to a predetermined order from among a plurality of second conductors 33 which compose the second conductor group 34. The detection section 54 detects presence or absence of the first, second and third frequencies from a signal supplied thereto and further detects the signal level of the detected frequencies. In other words, the operation described above is the same as the operation for detecting a touched position (touch panel function). Accordingly, the detection operation of a finger position in this operation state is such as described above. In this operation state, if a pen is operated, then presence of the pen operation can be recognized by detecting at least one of the first and second frequencies transmitted from the pen by the detection section 54. By switching the function of the position detection apparatus to the function as a pen tablet based on the recognition of the presence of a pen operation, the pen position can be detected two-dimensionally. Further, if the presence of both a pen and a finger as the two pointing members are detected simultaneously by the position detection circuit 230, then information about the finger and the pen can be detected simultaneously by time-divisionally (i.e., periodically) switching between the touch panel function and the pen tablet function as illustrated in FIG. 12. Further, the priority in function selection can be set by the control section 63 so that, if a pen and a finger are detected simultaneously, then the control section 63 advances to the operation for detecting one of a pen and a finger (i.e., by pen tablet or touch panel function, respectively).

[Modification 5]

FIG. 5 shows a configuration for detecting a signal of the first frequency f1 in order to detect the position pointed to by a pointing member, and pen pressure from a phase difference between the signal of the first frequency f1 and a signal of the second frequency f2 different in frequency from the signal of the first frequency f1 based on the capacitance of the variable capacitor 22 which varies in response to pressure (pen pressure) applied to the pointing member.

Figure 13:
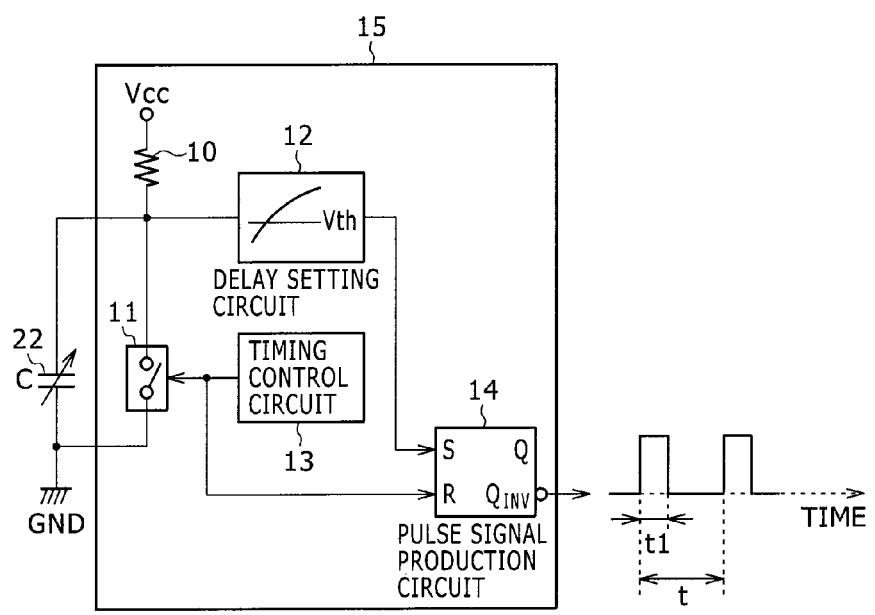
FIG. 13 is a block diagram of a schematic configuration of a portion of a pointing member of modification 5.

An integrated circuit 15 shown in FIG. 13 shows a configuration which combines frequency information for detecting a position pointed to by a pointing member and time information corresponding to the capacitance of the variable capacitor 22 which varies in response to pressure (pen pressure) applied to the pointing member into one signal and transmits the signal from the pointing member. It is to be noted that like components to those of FIG. 5 are denoted by like reference characters. The variable capacitor 22 whose capacitance C varies in response to the pressing force applied through the first electrode 20 is connected at one end thereof to the ground. The variable capacitor 22 is connected at the other end thereof to the power production circuit 25 through the resistor 10 so that a predetermined voltage Vcc is supplied to the variable capacitor 22. Further, the switch 11 is connected in parallel across the variable capacitor 22. The timing control circuit 13 carries out ON/OFF control of the switch 11 in a predetermined period. In particular, the switch 11 is first placed into an ON (i.e., closed) state to discharge the charge of the variable capacitor 22 and is then placed into an OFF (i.e., open) state.

In FIG. 13, the timing control circuit 13 places the switch 11 into an OFF state and supplies a signal to a reset terminal (R) of a pulse signal production circuit 14, which is formed, for example, from an RS flip-flop, so that a logic signal 1 is outputted as an initial value to an inverted output terminal $Q_{INV}$. If the switch 11 is placed into an OFF state, then since the variable capacitor 22 is gradually charged through the resistor 10, the potential across the opposite ends of the variable capacitor 22 gradually rises depending upon the capacitance C which varies in response to the pen pressure. The delay setting circuit 12 compares the potential at the middle point between the resistor 10 and the variable capacitor 22 with a predetermined threshold value Vth. If the potential of the variable capacitor 22 reaches the predetermined potential Vth, then the delay setting circuit 12 supplies a signal to the set terminal (S) of the pulse signal production circuit 14 to change the logic signal to be outputted from the inverted output terminal $Q_{INV}$ to a logic signal 0. By this configuration, the logic signal 1 is outputted from the inverted output terminal $Q_{INV}$ of the pulse signal production circuit 14 periodically in a period t within which the timing control circuit 13 controls the ON/OFF position of the switch 11, and is changed to the logic signal 0 after lapse of time t1, which is dependent on the capacitance C of the variable capacitor 22 that varies in response to the pen pressure. In other words, a PWM (Pulse Width Modulation) signal whose pulse width varies in response to the pen pressure is outputted periodically from the integrated circuit 15. Thus, by detecting the presence of the pulse signal by the position detector 3, the position pointed to by the pointing member can be determined, and by detecting the pulse width of the pulse signal, the pressure applied to the pointing member can be determined. It is to be noted that known circuits can be used to detect the presence of the pulse signal and to determine the pulse width of the pulse signal.

It is to be noted that, while, in the present embodiment, the position detector is configured such that it includes the selection circuit 40 for selecting a predetermined conductor, the selection circuit is not necessarily required. For example, if an individual reception circuit is provided for each of the first conductors 31 which compose the first conductor group 32, then the selection circuit 40 is not required. Further, for a similar reason, the position detector 200 shown in FIG. 10 does not necessarily require the first selection circuit 202 and the second selection circuit 203. Furthermore, while the first selection circuit 221 used with the position detection circuit 230 shown in FIG. 11 is provided in order to supply a transmission signal to a predetermined conductor, the first selection circuit 221 and the second selection circuit 222 are not necessarily required if a transmission signal having a unique frequency is supplied to each of the first conductors 31 as signal transmission conductors from the transmission signal production section 231, which is configured to produce a plurality of transmission signals individually having unique frequencies, and if each of the second conductors 33 as reception conductors is provided with an individual reception circuit, which can receive a plurality of signals having the unique frequencies and carry out analysis of the reception frequencies.

In the embodiment and the modifications 1 to 4 described above, an excitation signal from the excitation coil of the sensor section is received to produce a driving voltage for the integrated circuit in the pointing member. However, the present invention is not limited to this configuration. A power supply such as, for example, a battery may be provided in the inside of the pointing member. Further, while the detection section 54 in the reception system circuit group 51 described above is configured such that it includes a plurality of synchronous detectors which can carry out synchronous detection with reference signals of frequencies corresponding to individual transmission signals, the present invention is not limited to this configuration. Where the position detector is to operate as a pen tablet which accepts the operation of a pen, it is only necessary for the position detector to have a reception signal analysis function which can receive a signal transmitted from a pen as a pointing member and extract, in addition to a signal level of the reception signal, information of a frequency or, as occasion demands, information of a frequency and a phase. The position detector can be implemented by an analog filter or a digital filter or digital signal processing such as DFT (Discrete Fourier Transform) or DCT (Discrete Cosine Transform). Further, this similarly applies also where the position detector is caused to operate as a touch panel which accepts the operation of a finger, and it is only necessary for the position detector to have a reception signal analysis function which can receive a signal corresponding to a transmission signal produced by the transmission signal production section provided in the position detection circuit and extract, in addition to the signal level of the reception signal, information of a frequency or, as occasion demands, information of a frequency and a phase. Further, in regard to detection of the presence or absence of an operation of the side switch 113 shown in FIG. 9, a configuration may be provided for supplying an operation signal from the side switch 113 to the delay setting circuit 12 of FIG. 5 to change the threshold value Vth, to thereby detect operation of the side switch 113. More specifically, the threshold value Vth to be set by the delay setting circuit 12 may be changed, for example, to a high potential in response to the fact that the side switch 113 is operated. Where the threshold value Vth is set to the high level, even if the pressing force by the pointing member is equal, the signal to be outputted from the delay setting circuit 12 is outputted after further delay by a predetermined interval of time as a result of the setting of the threshold value Vth to the high potential. By this configuration, the production timing of a signal of the second frequency with respect to a signal of the first frequency is controlled in response to an operation of the side switch 113, and as a result, presence or absence of an operation of the side switch 113 can be detected.

While illustrative embodiments have been illustrated and described, it will be appreciated that various changes can be made therein without departing from the spirit and scope of the invention.

The embodiments of the invention in which an exclusive property or privilege is claimed are defined as follows:

1. A position detection apparatus, comprising:
    a pointing member which, in operation, transmits a signal for position pointing; and
    a position detector including a sensor section that is configured to be pointed to at a position thereof by said pointing member and to receive the signal for position pointing transmitted from said pointing member;
    wherein said position detector is configured to detect the position on said sensor section pointed to by said pointing member based on the signal for position pointing received by said sensor section;
    wherein said pointing member includes a transmission signal production section including two different frequency signal production sections which, in operation, respectively produce a signal of a first frequency and a signal of a second frequency that is different from the first frequency for frequency multiplexed transmission in a time-staggered but partially overlapping manner wherein the signal of the first frequency is indicative of a start timing of a time difference and the signal of the second frequency is indicative of an end timing of the time difference;
    wherein the transmission signal production section includes a delay setting circuit comprising a variable capacitor parallel to a periodic switch, the variable capacitor having one end coupled to a predetermined voltage through a resistor, the variable capacitor having capacitance that varies according to a pressing force applied to said pointing member when said pointing member points to the position on said sensor section, and the transmission signal production section, in operation, controls the time difference based on a time required to charge the variable capacitor to a defined threshold voltage;
    wherein the delay setting circuit, when the periodic switch is in an OFF state, charges the variable capacitor and causes the first frequency signal production section to produce the signal of the first frequency and, when the defined threshold voltage is reached, causes the second frequency signal production section to produce the signal of the second frequency to introduce the time difference between the signal of the first frequency and the signal of the second frequency and, when the periodic switch is in an ON state, discharges the variable capacitor;
    wherein said position detector detects the position on said sensor section pointed to by said pointing member based on at least one of the signal of the first frequency and the signal of the second frequency; and
    wherein said position detector detects the pressing force applied to said pointing member when said pointing member points to the position on said sensor section based on the time difference between the signal of the first frequency and the signal of the second frequency.

2. The position detection apparatus according to claim 1, wherein said pointing member includes a pen tip projecting from a housing of said pointing member and used for position pointing, and said transmission signal production section controls the time difference in response to the pressing force to said pen tip.

3. The position detection apparatus according to claim 2, wherein said pen tip includes a conductive member, and at least one signal produced by said transmission signal production section is transmitted through said pen tip.

4. The position detection apparatus according to claim 1, wherein said sensor section includes an excitation coil, and said pointing member includes a power production circuit for receiving an excitation signal from said excitation coil to produce power for driving said transmission signal production section provided in said pointing member.

5. The position detection apparatus according to claim 1, wherein said position detector is configured to detect that said pointing member is in a touching state with said sensor section or in a hovering state with respect to said sensor section based on the time difference between the signal of the first frequency and the signal of the second frequency or on the presence of the signal of the first frequency and the signal of the second frequency.

6. The position detection apparatus according to claim 1, wherein said pointing member has an operation switch provided on a side face thereof, and said transmission signal production section includes a third frequency signal production section which, in operation, produces a signal of a third frequency in response to an operation of said operation switch.

7. The position detection apparatus according to claim 1,
    wherein said sensor section includes a plurality of conductors disposed in a first direction and another plurality of conductors disposed in a second direction intersecting with the first direction, and
    wherein said position detector further includes:
        a second transmission signal production section configured to produce signals of a predetermined frequency; and
        a changeover section configured to selectively supply the signals produced by said second transmission signal production section to the plurality of conductors disposed in the first direction and to selectively receive signals produced in the plurality of conductors disposed in the second direction, wherein said changeover section is controlled to permit detection of a position on said sensor section pointed to by another pointing member that is different in type from said pointing member.

8. The position detection apparatus according to claim 7, wherein said changeover section is configured to control conductor selection in a predetermined period so that said position detector detects signals produced in the conductors disposed in both the first direction and the second direction to detect the position pointed to by said pointing member, while the signals produced by said second transmission signal production section are supplied to said conductors disposed in the first direction and signals produced in said conductors disposed in the second direction are detected by said position detector to detect the position on said sensor section pointed to by the other pointing member that is different in type from said pointing member.

9. The position detection apparatus according to claim 8, wherein the other pointing member that is different in type is a finger.

10. The position detection apparatus according to claim 7, wherein said second transmission signal production section is configured to produce a plurality of different kinds of signals such that the produced plurality of different kinds of signals are supplied to the plurality of conductors disposed in said first direction.

11. The position detection apparatus according to claim 7, wherein said second transmission signal production section is configured to produce a signal having a frequency that is different from the first frequency and the second frequency.

12. A pointing member which includes a pen tip projecting from a housing and is used for position pointing, comprising:
(a) a transmission signal production section including two different frequency signal production sections which, in operation, respectively produce a signal of a first frequency and another signal of a second frequency different from the first frequency for frequency multiplexed transmission, wherein the signal of the first frequency is indicative of a start timing of a time difference and the signal of the second frequency is indicative of an end timing of the time difference;
(b) a delay setting circuit comprising a variable capacitor parallel to a periodic switch, the variable capacitor having one end coupled to a predetermined voltage through a resistor, the variable capacitor having capacitance that varies according to a pressing force applied to the pen tip; and
(c) a controller which, in operation,
 (i) controls the time difference based on a time required to charge the variable capacitor to a defined threshold voltage by, when the periodic switch is in an OFF state, charging the variable capacitor and causing the first frequency signal production section to produce the signal of the first frequency and, when the defined threshold voltage is reached, causing the second frequency signal production section to produce the signal of the second frequency to introduce the time difference between the signal of the first frequency and the signal of the second frequency and, when the periodic switch is in an ON state, discharging the variable capacitor, and
 (ii) outputs the signal of the first frequency and the signal of the second frequency produced by said transmission signal production section in a time-staggered but partially overlapping manner.

13. The pointing member according to claim 12, further comprising an operation switch provided on a side face of the housing thereof, wherein the transmission signal production section includes a third frequency signal production section which, in operation, produces a signal of a third frequency in response to an operation of said operation switch.

14. The pointing member according to claim 12, wherein said pen tip includes a conductive member, and at least one signal produced by said transmission signal production section is transmitted through said pen tip.

15. A position detection method to detect a position on a sensor section pointed to by a pointing member and to detect pen pressure on the pointing member, comprising:
receiving a signal of a first frequency and a signal of a second frequency different from the first frequency, which are produced from two different frequency signal production sections and are frequency multiplexed in a time-staggered but partially overlapping manner, from the pointing member, wherein the signal of the first frequency is indicative of a start timing of a time difference and the signal of the second frequency is indicative of an end timing of the time difference and the time difference is controlled based on a time required to charge a variable capacitor of a delay setting circuit of the pointing member to a defined threshold voltage, the variable capacitor being provided in parallel to a periodic switch, the variable capacitor having one end coupled to a predetermined voltage through a resistor, and the variable capacitor having capacitance that varies according to a pressing force applied to the pointing member when the pointing member points to a position on the sensor section, wherein the delay setting circuit, when the periodic switch is in an OFF state, charges the variable capacitor and causes one of the frequency signal production sections to produce the signal of the first frequency and, when the defined threshold voltage is reached, causes the other of the frequency signal production sections to produce the signal of the second frequency to introduce the time difference between the signal of the first frequency and the signal of the second frequency and, when the periodic switch is in an ON state, discharges the variable capacitor;
detecting a position on the sensor section pointed to by the pointing member based on at least one of the signal of the first frequency and the signal of the second frequency; and
detecting the pressing force applied to the pointing member when the pointing member points to the position on the sensor section based on the time difference between the signal of the first frequency and the signal of the second frequency.

16. A method of operating a pointing member to transmit an indication of a pressing force on a pen tip of the pointing member, comprising:
changing capacitance of a variable capacitor in a delay setting circuit of the pointing member according to a pressing force applied to the pen tip of the pointing member,
producing a signal of a first frequency and another signal of a second frequency different from the first frequency, wherein the signal of the first frequency is indicative of a start timing of a time difference and the signal of the second frequency is indicative of an end timing of the time difference,
controlling the time difference between the two signals based on a time required to charge the variable capacitor to a defined threshold voltage, wherein the variable capacitor is parallel to a periodic switch and has one end coupled to a predetermined voltage through a resistor, and wherein the delay setting circuit, when the periodic switch is in an OFF state, charges the variable capacitor and produces the signal of the first frequency and, when the defined threshold voltage is reached, produces the signal of the second frequency to introduce the time difference between the signal of the first frequency and the signal of the second frequency and, when the periodic switch is in an ON state, discharges the variable capacitor, and
transmitting the two signals in frequency multiplexed transmission in a time-staggered but partially overlapping manner.

* * * * *